United States Patent
Mueller

Patent Number: 5,354,086
Date of Patent: Oct. 11, 1994

[54] FOOTREST HOLDER FOR MOTORCYCLES

[75] Inventor: Werner Mueller, Koenigsmoos, Fed. Rep. of Germany

[73] Assignee: Motorrad Mueller GmbH, Fed. Rep. of Germany

[21] Appl. No.: 22,302

[22] Filed: Feb. 25, 1993

[30] Foreign Application Priority Data

Feb. 28, 1992 [DE] Fed. Rep. of Germany ... 9202600[U]

[51] Int. Cl.⁵ .............................................. B62J 25/00
[52] U.S. Cl. ................................. 280/291; 180/219; 180/293; 296/75; 74/474; 74/512; 74/564
[58] Field of Search .............. 180/219, 291, 299, 293; 280/291, 163; 296/75; 74/474, 512, 564

[56] References Cited

U.S. PATENT DOCUMENTS

| | | | |
|---|---|---|---|
| 1,261,442 | 4/1918 | Rigby | 74/564 X |
| 1,675,551 | 7/1928 | Harley et al. | 280/291 |
| 2,285,313 | 6/1942 | Tagliaboschi | 280/291 |
| 4,779,481 | 10/1988 | Natzke et al. | 280/291 X |
| 5,211,256 | 5/1993 | Muramatsu | 74/512 X |

FOREIGN PATENT DOCUMENTS

| | | | |
|---|---|---|---|
| 0335966 | 10/1903 | France | |
| 0060891 | 3/1990 | Japan | 280/291 |
| 0128973 | 5/1990 | Japan | 280/291 |
| 0202726 | 10/1923 | United Kingdom | |
| 0240300 | 10/1925 | United Kingdom | |

*Primary Examiner*—Margaret A. Focarino
*Assistant Examiner*—Florian Zeender
*Attorney, Agent, or Firm*—Pascal & Associates

[57] ABSTRACT

A footrest holder for a motorcycle comprising two mounting plates for attachment to a vehicle frame, of the motorcycle, an arm extending therefrom for supporting a gearshift or brake lever on its free end, the arm being pivotable about an axis at right angles to the swivel axis of the arm, the arm being formed by a continuous rod which carries the plates, and at least one of the plates is movably mountable on the rod.

18 Claims, 2 Drawing Sheets

FOOTREST HOLDER FOR MOTORCYCLES

FIELD OF THE INVENTION

The invention relates to a footrest holder for motorcycles.

BACKGROUND TO THE INVENTION

Motorcycle footrest holders according to the prior art are divided into two parts, each part having a mounting plate from which an arm extends and pivots a gearshift or brake lever on its free end. The end of each arm is slotted and supports a footrest in the slot which can be folded upwardly. The mounting plate is elongated and has two mounting bores in both of its ends with which the mounting plates can be connected to the corresponding plates of the vehicle frame of the motorcycle.

This construction has a disadvantage in that the connection between the mounting plate and the plate on the frame is relatively unstable and that a torque acts on this connection when in use. This is particularly disadvantageous when one of the screws which connect the plates to one another becomes loose. It should be noted that the arms support the gearshift and brake levers.

SUMMARY OF INVENTION

An object of the present invention is to construct the footrest holder in such a way that a secure connection with the plates on the frame is assured. In accordance with an embodiment of the invention a footrest holder for a motorcycle comprising an arm, two mounting plates for attachment to a vehicle frame of the motorcycle carried by the arm, the arm being formed by a continuous rod and supporting a lever for a gearshift or brake on a free end, the lever being pivotable about a horizontal swivel axis, a footrest extending from the arm in such a way that it can be folded about an axis at right angles to the swivel axis of the lever, one of the plates being movably mountable on the arm, the other plate being firmly attached to the arm.

BRIEF INTRODUCTION TO THE DRAWINGS

Embodiments of the invention shall be described in greater detail below with reference to the drawings, in which:

FIG. 1 is a partially exploded perspective view of a first embodiment of the invention, and FIG. 2 is a partially exploded perspective view of a second embodiment of the invention.

DETAILED DESCRIPTION OF THE INVENTION

Figure 1:
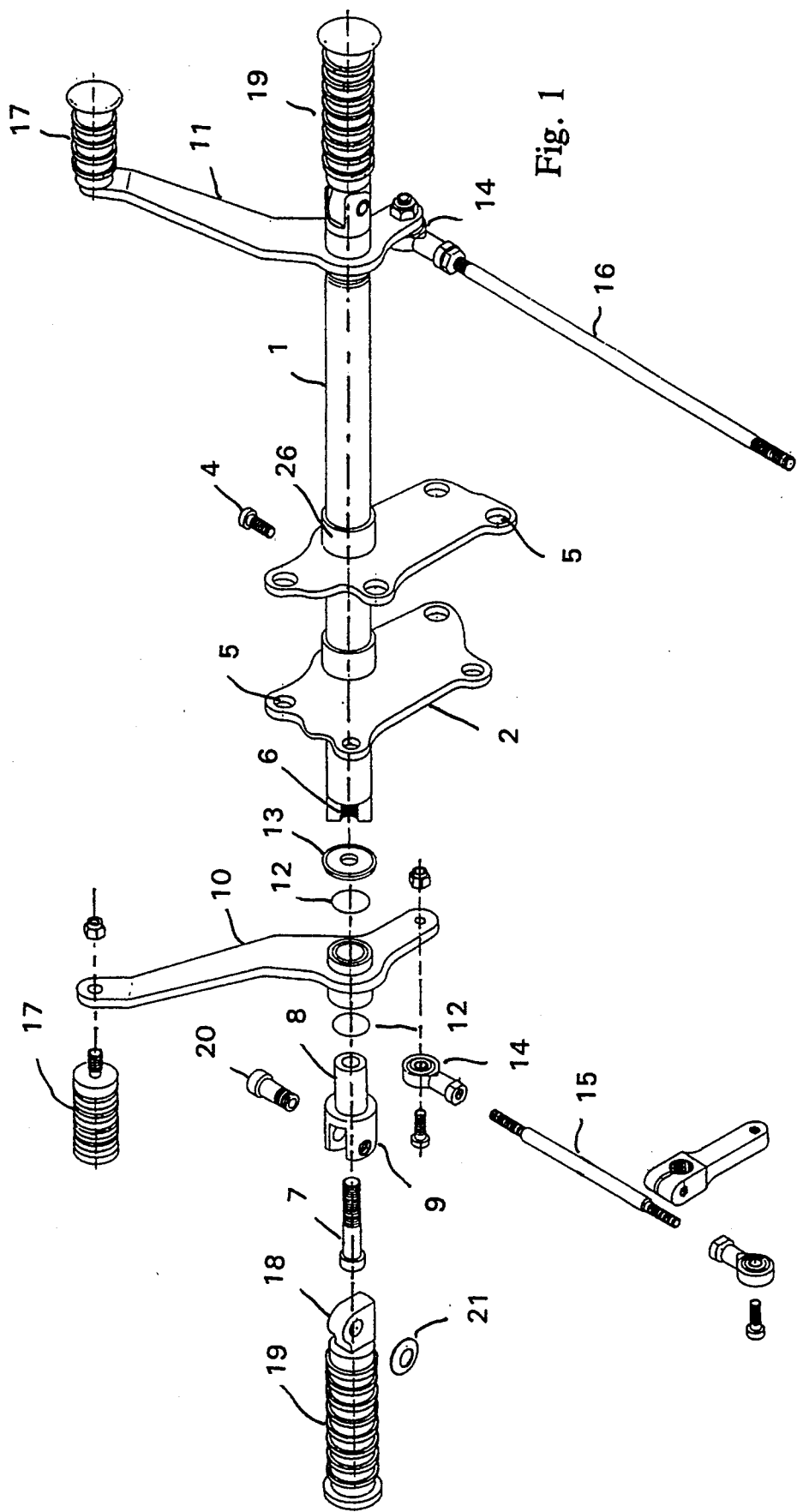

The footrest holder shown in FIG. 1 has an arm formed of a continuous rod 1 on which two mounting plates 2, 3 are located. These mounting plates 2, 3 are connected to corresponding mounting plates on the vehicle frame of the motorcycle. The one plate 2 is firmly pressed onto the rod 1, whereas mounting plate 3 is movable along the rod 1 and can be fastened to the rod 1 by means of a clamping screw 4. Due to the movability of mounting plate 3, tolerances in the width of the vehicle frame can be compensated.

Mounting plates 2, 3 are essentially rectangular and have a mounting bore 5 at each of their corner points. This creates a stable mounting base for the rod 1.

On each of its ends, the rod 1 is provided with a tapped bore 6, whereby the wall of the bore 6 on the left is shown partially broken. In this way, a pivot journal 8, having a longitudinal bore and a slotted head 9, can be connected with rod 1 via a screw 7. The left pivot journal 8 carries a gearshift lever 10, whereas the right pivot journal carries a brake lever 11. The bearing bores of levers 10, 11 have an annular slot on each of their ends for receiving sealing rings 12. Furthermore, the bearing bushings of levers 10, 11 are provided with a lubricating nipple (not shown). A spacer washer 13 is provided, in each case, between the ends of the rod and the bearing bushings of levers 10, 11.

Ball joints 14, which can be respectively connected to gearshift rod 15 and to brake rod 16, can be screwed together with the short ends of levers 10, 11. A control rest 17 is connected to each of the long ends of levers 10, 11.

The slots of the head 9 are each used to receive the mounting end 18 of a footrest 19. To support it, the mounting end 18 and the head 9 each has a horizontally extending bore into which a screw bolt 20 can be inserted. In this way, a respective footrest 19 can be horizontally folded down or folded upward. A cup spring 21 is inserted into the slot of the head 9 so that it retains its upper position.

Figure 2:
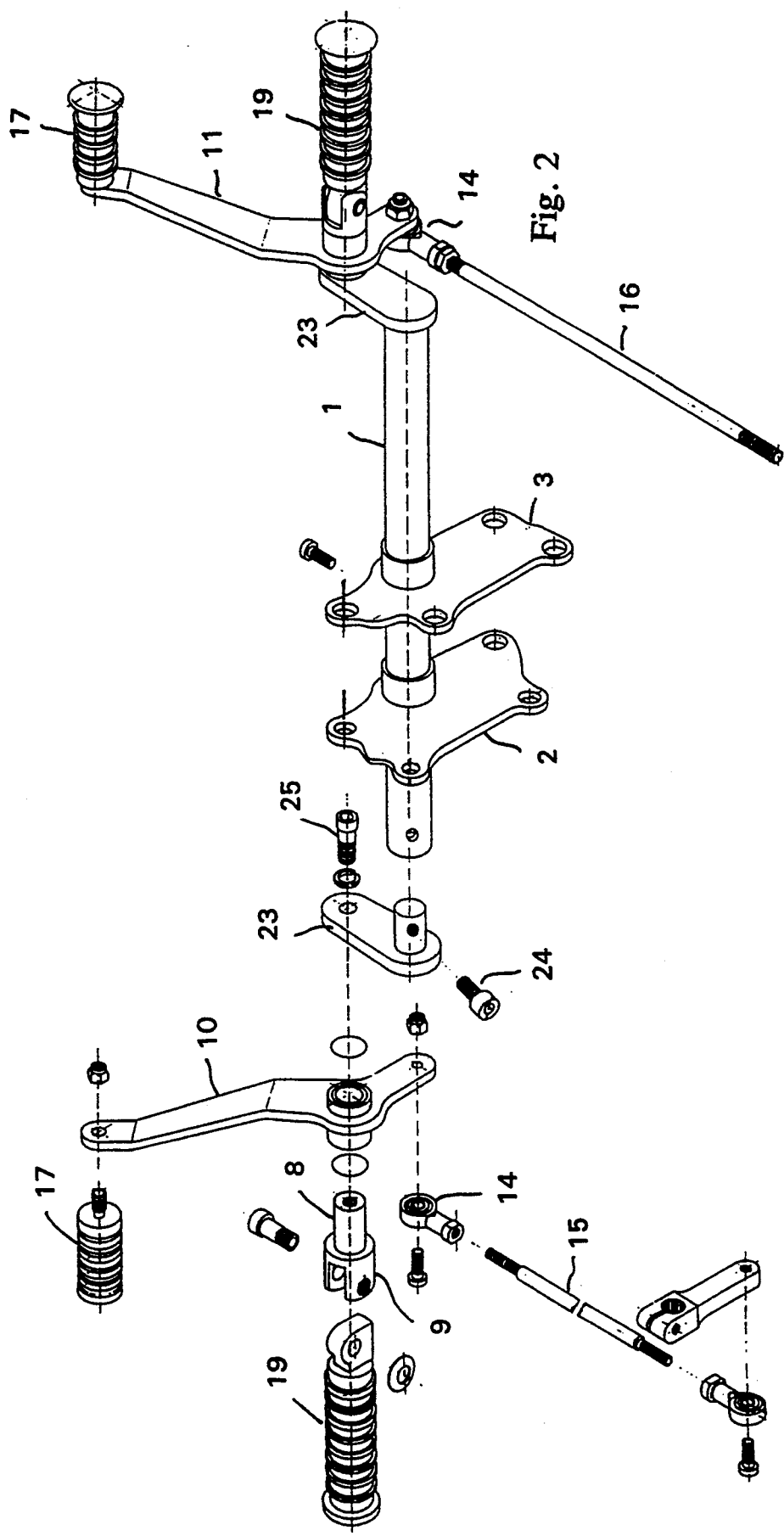

The embodiment of FIG. 2 differs from that of FIG. 1 in that the ends of the rod 1 in FIG. 2 are each provided with a smooth bore instead of the tapped hole 6, into which the pin 22 of a crank head 23 which has a tapped hole is received. Moreover, a cross-bore is provided on the rod ends so that the crank lever 23 can be connected to the respective ends of rod 1 via screw 24. Each crank lever 23 is provided with a bore on its end facing away from the pin 22, via which the pivot journal 8 can be connected by means of a screw 25, which has, in contrast to the embodiment of FIG. 1, a tapped hole and not a through bore.

Instead of a clamping screw 4, the plate 3 can be clamped by a force fit. In this case, the bushing 26 of plate 3 is formed like a slotted adapter bush having a truncated conical outer contour and with an external thread onto which a lock nut having a truncated conical inside contour is screwed, which presses the adapter bush together against the rod 1.

I claim:

1. A footrest holder for a motorcycle comprising an arm, two mounting plates for attachment to a vehicle frame of the motorcycle carried by the arm, the arm being formed by a continuous rod and lever for a gearshift or brake on a free end, the lever being pivotable about a horizontal swivel axis, a footrest extending from the arm in such a way that it can be folded about an axis at right angles to the swivel axis of the lever, one of the plates being movably mountable on the arm, the other plate being firmly attached to the arm.

2. A footrest holder as defined in claim 1, in which the movable plate is fastened to the arm by means of a clamping screw.

3. A footrest holder as defined in claim 1, in which the movable plate is fastened to the arm by means of a force fit.

4. A footrest holder as defined in claim 1, in which the lever is supported by a pivot journal which has a slotted head, the footrest being supported in the slot of the head.

5. A footrest holder as defined in claim 4, in which the lever has a bearing bushing including a sealing ring on both sides thereof, the bearing bushing having a lubricating nipple in a region between the sealing rings.

6. A footrest holder as defined in claim 4, in which the pivot journal is screwed together with the end of the arm.

7. A footrest holder as defined in claim 4, in which the pivot journal is screwed together with a crank lever, the crank lever being screwed together with the end of the arm.

8. A footrest holder as defined in claim 1, in which a rod for the gearshift or brake is articulated to the lever via a ball joint.

9. A footrest holder as defined in claim 1, in which the plates are essentially rectangular and each has a mounting bore at each of its corners.

10. A footrest holder as defined in claim 8, in which the plates have through holes for the arm which are located adjacent a longitudinal side of the plates.

11. A footrest holder as defined in claim 6, in which a rod for the gearshift or brake is articulated to the lever via a ball joint.

12. A footrest holder as defined in claim 7, in which a rod for the gearshift or brake is articulated to the lever via a ball joint.

13. A footrest holder as defined in claim 6, in which the plates are essentially rectangular and each has a mounting bore at each of its corners.

14. A footrest holder as defined in claim 7, in which the plates are essentially rectangular and each has a mounting bore at each of its corners.

15. A footrest holder as defined in claim 8, in which the plates are essentially rectangular and each has a mounting bore at each of its corners.

16. A footrest holder as defined in claim 13, in which the plates have through holes for the arm which are located adjacent a longitudinal side of the plates.

17. A footrest holder as defined in claim 14, in which the plates have through holes for the arm which are located adjacent of a longitudinal side of the plates.

18. A footrest holder as defined in claim 16, in which the plates have through holes for the arm which are located adjacent of a longitudinal side of the plates.

* * * * *